United States Patent
Zagranski et al.

(10) Patent No.: US 7,136,738 B2
(45) Date of Patent: Nov. 14, 2006

(54) FUEL CONTROL SYSTEM FOR GAS TURBINE ENGINES

(75) Inventors: Raymond D. Zagranski, Somers, CT (US); John Mannarino, Montreal (CA); Cristina Crainic, Longueuil (CA)

(73) Assignees: Goodrich Pump & Engine Control Systems, Inc., West Hartford, CT (US); Pratt & Whitney Canada Corp., Longueuil (CA)

(*) Notice: Subject to any disclaimer, the term of this patent is extended or adjusted under 35 U.S.C. 154(b) by 0 days.

(21) Appl. No.: 10/694,973

(22) Filed: Oct. 28, 2003

(65) Prior Publication Data

US 2004/0093151 A1 May 13, 2004

Related U.S. Application Data

(62) Division of application No. 10/140,847, filed on May 8, 2002, now Pat. No. 6,715,277.

(60) Provisional application No. 60/332,247, filed on Nov. 16, 2001.

(51) Int. Cl.
*F02C 6/00* (2006.01)
*F02C 9/00* (2006.01)

(52) U.S. Cl. .................. 701/100; 60/39.25; 701/101

(58) Field of Classification Search ................ 701/100, 701/101; 60/39.25, 235, 242, 243, 791, 39.281, 60/773, 204, 39.182, 730, 39.27; 123/294, 123/530, 406.47

See application file for complete search history.

(56) References Cited

U.S. PATENT DOCUMENTS

| | | | | | |
|---|---|---|---|---|---|
| 3,777,479 | A | * | 12/1973 | Hagen | 60/39.25 |
| 3,777,480 | A | * | 12/1973 | Stoltman | 60/39.281 |
| 3,878,676 | A | * | 4/1975 | Hitzelberger | 60/39.281 |
| 4,134,257 | A | * | 1/1979 | Riple | 60/773 |
| 4,545,198 | A | * | 10/1985 | Yoshida | 60/39.25 |
| 5,379,584 | A | * | 1/1995 | Windish et al. | 60/204 |
| 6,244,039 | B1 | * | 6/2001 | Sugishita et al. | 60/39.182 |

* cited by examiner

*Primary Examiner*—Dalena Tran
(74) *Attorney, Agent, or Firm*—David J. Silvia; Edwards Angell Palmer & Dodge LLP (57) ABSTRACT

Fuel control systems for use with a gas turbine engines which accounts for real-time thermodynamic engine effects when attempting to match or track the $NDOT_{Actual}$ rate to the $NDOT_{Demand}$ rate. The fuel control system includes a mechanism for measuring several engine operating parameters and a mechanism for determining an initial engine fuel demand based on the measured engine operating parameters. The control system further includes a mechanism for estimating, during engine operation and based on the measured operating parameters, the amount of heat transferred between fuel combustion gases and the engine metal and estimating an effective fuel flow adjustment based therefrom. The control system disclosed herein also includes a mechanism for determining a final engine fuel demand based on the initial predicted engine fuel demand and the estimated effective fuel flow adjustment.

10 Claims, 10 Drawing Sheets

| Fig. 2A | Fig. 2B | Fig. 2C |

NDOT CONTROL PERFORMANCE
(WITHOUT WFMETAL LOOP)

FUEL CONTROL SYSTEM FOR GAS TURBINE ENGINES

CROSS REFERENCE TO RELATED APPLICATIONS

This application is a divisional application of U.S. patent application Ser. No. 10/140,847, filed May 8, 2002, now U.S. Pat. No. 6,715,277, which claims priority to U.S. Provisional Application No. 60/332,247, filed Nov. 16, 2001, both of which are herein incorporated by reference in their entirety to the extent that it is not inconsistent with this disclosure.

GOVERNMENT RIGHTS STATEMENT

The U.S. Government has a paid-up license in this invention and the right in limited circumstances to require the patent owner to license others on reasonable terms as provided for by the terms of DAAH10-99-2-0005, awarded by the U.S. Department of the Army.

BACKGROUND OF THE INVENTION

1. Field of the Invention

The subject disclosure relates to a fuel control system for use with gas turbine engines, and more particularly to, a fuel control system which utilizes computed signals from an embedded, real-time thermodynamic engine model when attempting to match actual core engine acceleration or deceleration rates to the demanded rate.

2. Background of the Related Art

Typically, a gas turbine engine control system modulates fuel flow to the engine in order to match or "track" the actual rate of change of the gas generator speed ($NDOT_{Actual}$) to the demanded rate of change of the gas generator speed, $NDOT_{Demand}$. The maximum demanded NDOT rate is obtained from an acceleration schedule. The acceleration schedule is traditionally provided by the engine manufacturer and is developed over time to protect the engine from surge, stall and overtemperature. As a result, the acceleration schedule is specific or unique to a particular engine model. The schedule typically represents $NDOT_{Demand}$ as a function of measured gas generator speed (NH) and inlet air temperature and pressure. The schedule is not linear, but of complex shape. The complexity of the schedule is partly due to the need to prevent the engine from operating in the compressor stall region.

State-of-the-art digital control systems typically use a proportional plus integral (and sometimes derivative) NDOT control loop to modulate fuel flow and null out the error between the measured actual acceleration/deceleration rate of the core engine gas generator ($NDOT_{Actual}$) and the demanded rate ($NDOT_{Demand}$). Since the engine is a highly non-linear complex machine, the matching or tracking of actual versus demanded NDOT rate is sometimes imperfect, especially during rapid engine accelerations or decelerations. More specifically, during severe operational transients, the control system is unable to drive the error between $NDOT_{Demand}$ and $NDOT_{Actual}$ to zero.

The inability to track the $NDOT_{Actual}$ rate to the $NDOT_{Demand}$ rate is partly caused by control design tradeoffs, namely bandwidth limitations which result from an overriding desire to insure control loop stability. More importantly however, current state-of-the-art control systems do not account for external disturbances to the NDOT control loop, such as real-time thermodynamic engine effects, which adversely affect NDOT rate tracking.

As a result of the inability to accurately track the actual NDOT rate to the demanded rate, engine surge events could occur if actual NDOT overshoots the acceleration limit. An engine surge creates a sudden torque disturbance to the driven load. In a helicopter application, an engine surge event typically imparts a torque disturbance to the load system, which consists generally of an engine output shaft, a clutch, a gearbox, and shaft driven main and tail rotors. The sudden torque disturbance can cause the underdamped rotor drive train to ring which can result in transient overstressing of mechanical parts and result in engine drive train damage.

Therefore, there is a need for an improved NDOT tracking system which during operational transients, more accurately matches the $NDOT_{Actual}$ rate to the $NDOT_{Demand}$ rate by accounting for real-time thermodynamic engine effects.

SUMMARY OF THE INVENTION

The subject disclosure relates to fuel control systems which account for real-time thermodynamic engine effects when attempting to match or track the $NDOT_{Actual}$ rate to the $NDOT_{Demand}$ rate. The fuel control systems disclosed herein recognize that a significant cause of poor NDOT rate tracking is the effect of heat being transferred between the combustion gases and the engine metal. During an engine acceleration, heat is diverted from the burned fuel being metered by the NDOT control to the engine metal, resulting in a reduced actual NDOT rate and thereby degrading NDOT tracking performance. Conversely, during an engine deceleration, heat is transferred from the engine metal to the combustion gases, resulting in an increase in $NDOT_{actual}$ and also degraded tracking performance.

The subject disclosure is directed to a fuel control system for use with a gas turbine engine which includes a mechanism for measuring several engine operating parameters and a mechanism for determining an initial engine fuel demand based on the measured engine operating parameters. The control system further includes a mechanism for estimating, during engine operation and based on the measured operating parameters, the amount of heat transferred between the fuel combustion gases and the engine metal and estimating an effective fuel flow adjustment therefrom. The control system disclosed herein also includes a mechanism for determining a final engine fuel demand based on the initial predicted engine fuel demand and the estimated effective fuel flow adjustment.

Preferably, the mechanism for measuring a variety of engine operating parameters includes a device which provides a signal indicative of the actual rotary speed of the engine gas generator and an element for measuring the actual engine compressor discharge pressure.

It is presently envisioned that the mechanism for determining the initial engine fuel demand further includes a closed loop NDOT controller that modulates fuel flow in response to a comparison of the actual rate of change of gas generator speed, determined from the gas generator speed signal, to a maximum and minimum desired rate of change of gas generator speed. It also envisioned that the maximum and minimum desired rate of change of gas generator speed is determined based on acceleration and deceleration schedules and is a function of the gas generator speed signal and inlet air temperature and pressure.

Preferably, the mechanism for estimating the amount of heat transferred between the fuel combustion gases and the engine metal includes an engine combustion model. The combuster model estimates the amount of heat generated by fuel combustion, the amount of heat generated by supply air compression, and the gas generator exit gas temperature.

The mechanism for estimating the effective fuel flow adjustment preferably includes a fuel flow adjuster model. The fuel flow adjuster model predicts the effective fuel flow adjustment required to account for the real-time thermodynamic effects from the estimated heat transferred, the gas generator efficiency and the heating coefficient of fuel. In a preferred embodiment, the mechanism for estimating the effective fuel flow adjustment further comprises an amplifier means for providing a gain amplified effective fuel flow adjustment.

The fuel control system disclosed herein also preferably includes a fuel metering system which supplies fuel to the engine based on the final predicted engine fuel demand. The fuel metering device can include a fixed displacement pump and metering/pressure regulating valves or be a variable delivery system.

The subject disclosure is also directed to a method of fuel control for gas turbine engines having a compressor and a gas generator. The fuel control method disclosed herein includes the steps of measuring a plurality of engine operating parameters and determining an initial engine fuel therefrom. The method of fuel control also includes the steps of estimating during engine operation and based on the plurality of measured operating parameters, an amount of heat transferred between fuel combustion gases and engine metal, estimating an effective fuel flow adjustment based on the estimated heat transfer between the combustion gases and the engine metal, and determining a final engine fuel demand based on the initial engine fuel demand and the estimated effective fuel flow adjustment.

Preferably, the steps of measuring a variety of engine operating parameters includes the steps of measuring the actual gas generator speed, providing a signal indicative thereof, measuring actual engine compressor discharge pressure, and providing a signal indicative thereof.

It is envisioned that the step of determining the initial engine fuel demand includes the use of a fuel flow controller which iteratively compares an actual rate of change of gas generator speed, determined from the gas generator speed signal, to a desired rate of change of gas generator speed. The desired rate of change of gas generator speed is determined from an acceleration/decelleration schedule and is a function of the gas generator speed signal.

It is presently preferred that the step of estimating the amount of heat transferred between the fuel combustion gases and the engine metal includes the steps of estimating an amount of heat generated by the fuel combustion, estimating an amount of heat generated by supply air compression, and estimating the gas generator exit gas temperature.

The step of estimating the effective fuel flow adjustment preferably includes determining the effective fuel flow adjustment from the estimated heat transfer, gas generator efficiency and a heating coefficient of fuel. The step of estimating the effective fuel flow adjustment further includes an amplifier for providing a gain multiplied effective fuel flow adjustment and a signal indicative thereof.

Preferably, the method of fuel control further includes supplying, by means of a fuel metering system, fuel to the engine based on the signal of final engine fuel demand. In one embodiment, the fuel metering device includes a variable displacement vane pump.

The subject disclosure is also directed to a fuel control system for use with a gas turbine engine which includes a means for measuring a plurality of engine operating parameters, a means for determining an initial engine fuel demand based on the plurality of measured engine operating parameters. The fuel control system further includes a means for measuring during engine operation an amount of heat transferred between the fuel combustion gases and the engine metal, a means for estimating an effective fuel flow adjustment based on the measured heat transfer, and a means for determining a final engine fuel demand based on the initial engine fuel demand and the estimated effective fuel flow adjustment.

The subject disclosure is also directed to a method of fuel control for gas turbines which includes the steps of measuring a plurality of engine operating parameters, determining an initial engine fuel demand based on the plurality of measured engine operating parameters, and measuring an amount of heat transferred between fuel combustion gases and engine metal. The method further including estimating an effective fuel flow adjustment based on the measured heat transfer between the combustion gases and the engine metal and determining a final engine fuel demand based on the initial engine fuel demand and the estimated effective fuel flow adjustment.

Those skilled in the art will readily appreciate that the subject invention more accurately matches the $NDOT_{Actual}$ rate to the $NDOT_{Demand}$ rate of the gas turbine engine by accounting for real-time thermodynamic engine effects. These and other unique features of the fuel control system disclosed herein will become more readily apparent from the following description, the accompanying drawings and the appended claims.

BRIEF DESCRIPTION OF THE DRAWINGS

So that those having ordinary skill in the art to which the subject disclosure appertains will more readily understand how to make and use the same, reference may be had to the drawings wherein.

These and other features of the subject disclosure will become more readily apparent to those having ordinary skill in the art from the following detailed description of preferred embodiments.

DETAILED DESCRIPTION OF PREFERRED EMBODIMENTS

Figure 1:
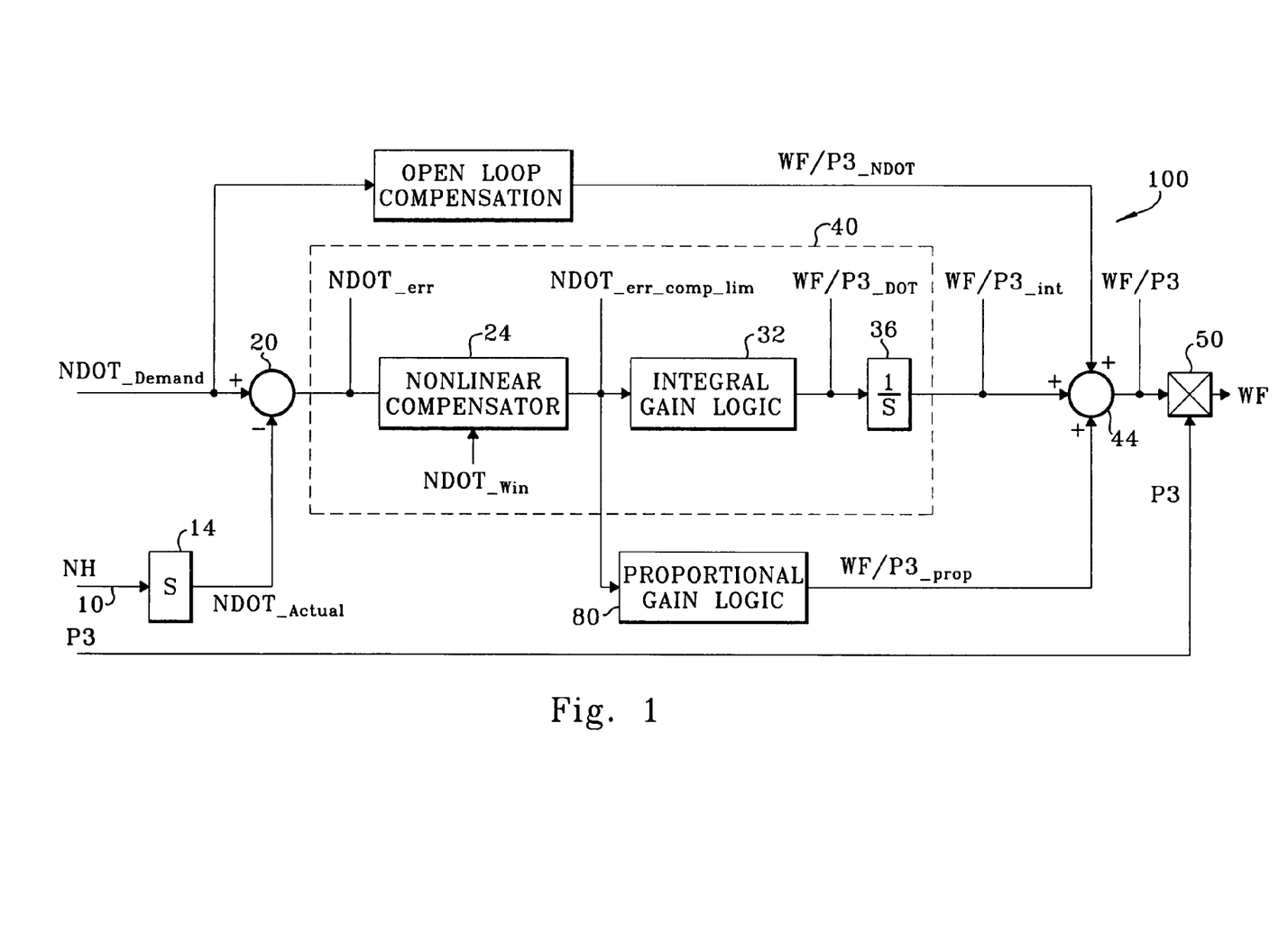
FIG. 1 is a schematic representation of a state-of-the-art digital control system which includes proportional and integral NDOT control logic.

Referring now to the drawings wherein like reference numerals identify similar elements of the subject invention, there is illustrated in FIG. 1 a schematic representation of a prior art NDOT tracking system designated generally by reference numeral 100. Tracking system 100 includes a traditional NDOT controller that utilizes integral control logic 40 and proportional control logic 80 to determine the desired fuel flow (WF).

In operation, the gas generator speed (NH) is measured, typically by a tachometer that is operatively associated with the gas generator spool shaft (not shown). The measured value of NH is used to determine the actual and demanded NDOT rates. The actual NDOT rate is obtained by providing a signal indicative of the sensed value of NH to differentiator or derivative logic 14. The output of derivative logic 14 is a signal which represents the rate of change of measured NH with respect to time, $NDOT_{actual}$. As noted above, the measured NH is also used to determine $NDOT_{Demand}$ by applying the measured NH to an acceleration schedule (not shown). The acceleration schedule is typically provided by the engine manufacturer and is developed over time during engine prototype testing. As a result, the acceleration schedule is specific or unique to a particular engine model. The schedule is not linear, but of complex shape, partly due to the need to prevent the engine from operating in the compressor stall region.

Signals representing $NDOT_{Actual}$ and $NDOT_{demand}$ are provided to summing junction 20. At summing junction 20, the signal representing $NDOT_{actual}$ is subtracted from the $NDOT_{demand}$ rate, thereby providing a rate tracking error ($NDOT_{error}$) or the difference between the actual and the desired rate of change of gas generator speed. Tracking system 100 attempts, through successive iterative steps, to reduce the tracking error to zero. This process is what is referred to as attempting to match or track the actual NDOT rate to the demanded rate.

The resulting $NDOT_{error}$ is provided as an input signal to integral control logic 40. $NDOT_{error}$ and $NDOT_{win}$ are applied to nonlinear compensator 24. $NDOT_{win}$ is a product of an auctioning circuit (not shown) which is configured to establish a maximum and a minimum NDOT rate based upon engine operating limits related to acceleration, deceleration, torque and temperature. Commonly assigned U.S. patent application Ser. No. 09/963,180, filed Sep. 26, 2001, the disclosure of which is herein incorporated by reference, provides a more detailed disclosure of a method for determining $NDOT_{win}$. The output of nonlinear compensator 24 is $NDOT_{err\_comp\_lim}$. $NDOT_{err\_comp\_lim}$ is supplied to NDOT integral gain logic 32 and proportional control logic 80.

The NDOT integral gain logic 32, which is a function of speed and altitude, converts the $NDOT_{err\_comp\_lim}$ into a rate of change over time of fuel flow (WF) with respect to the high pressure compressor discharge pressure (P3), hereinafter referred to as $WF/P3_{DOT}$. Then integrator 36 converts $WF/P3_{DOT}$ into $WF/P3_{int}$, a portion of the total fuel flow per high pressure compressor discharge pressure (based on the integral logic).

As mentioned previously, the $NDOT_{err\_comp\_lim}$ is also provided to proportional control logic 80 where a series of gain amplifiers are applied and result in a second component of the total fuel flow per high pressure compressor discharge pressure which is based on the proportional logic, $WF/P3_{prop}$. If the measured value of NH is greater than 50% of the rated speed, a signal representative of $WF/P3_{prop}$ is provided to summing junction 44 where it is added to $WF/P3_{int}$ and to $WF/P3_{NDOT}$, resulting in WF/P3. Lastly, multiplier 50 multiplies WF/P3 and P3 resulting in the demanded fuel flow to the core engine, WF.

This process is continually repeated during the operation of the core engine. Each successive iteration attempts to match or track the actual to the demanded NDOT and reduce $NDOT_{error}$ to zero. However, as noted above, since the engine is a highly non-linear complex machine, the matching or tracking of actual versus demanded NDOT rate is sometimes imperfect, especially during rapid engine accelerations or decelerations. More specifically, since current state-of-the-art controllers do not account for external disturbances or losses, such as thermodynamic effects, during severe operational transients, the control system is unable to command the engine to accurately follow or track to the demanded acceleration schedule. As will be described hereinbelow with respect to FIGS. 2a–2c, the fuel control system of the subject disclosure accounts for the real-time thermodynamic engine effects and adjusts the desired fuel flow accordingly.

Figure 2:
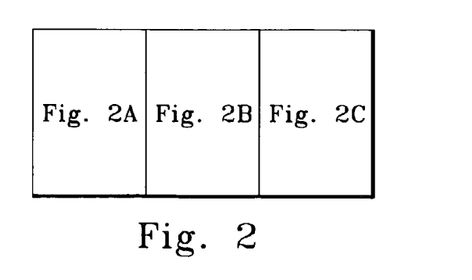
FIG. 2 is an arrangement of views for FIGS. 2a–2c.
Figure 2A:
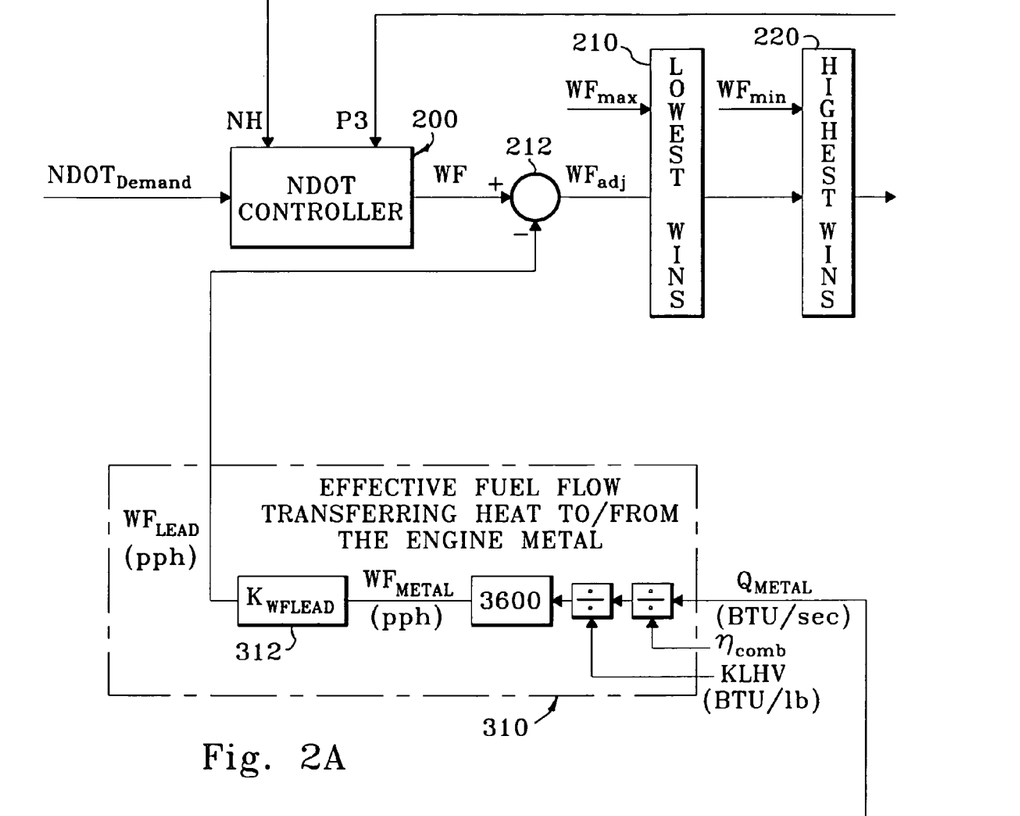
FIGS. 2a–2c are a schematic representations of a precision fuel control system configured in accordance with a preferred embodiment of the subject disclosure wherein the desired core engine fuel flow is adjusted to account for the heat transferred between the combustion gases and the engine metal.
Figure 2B:
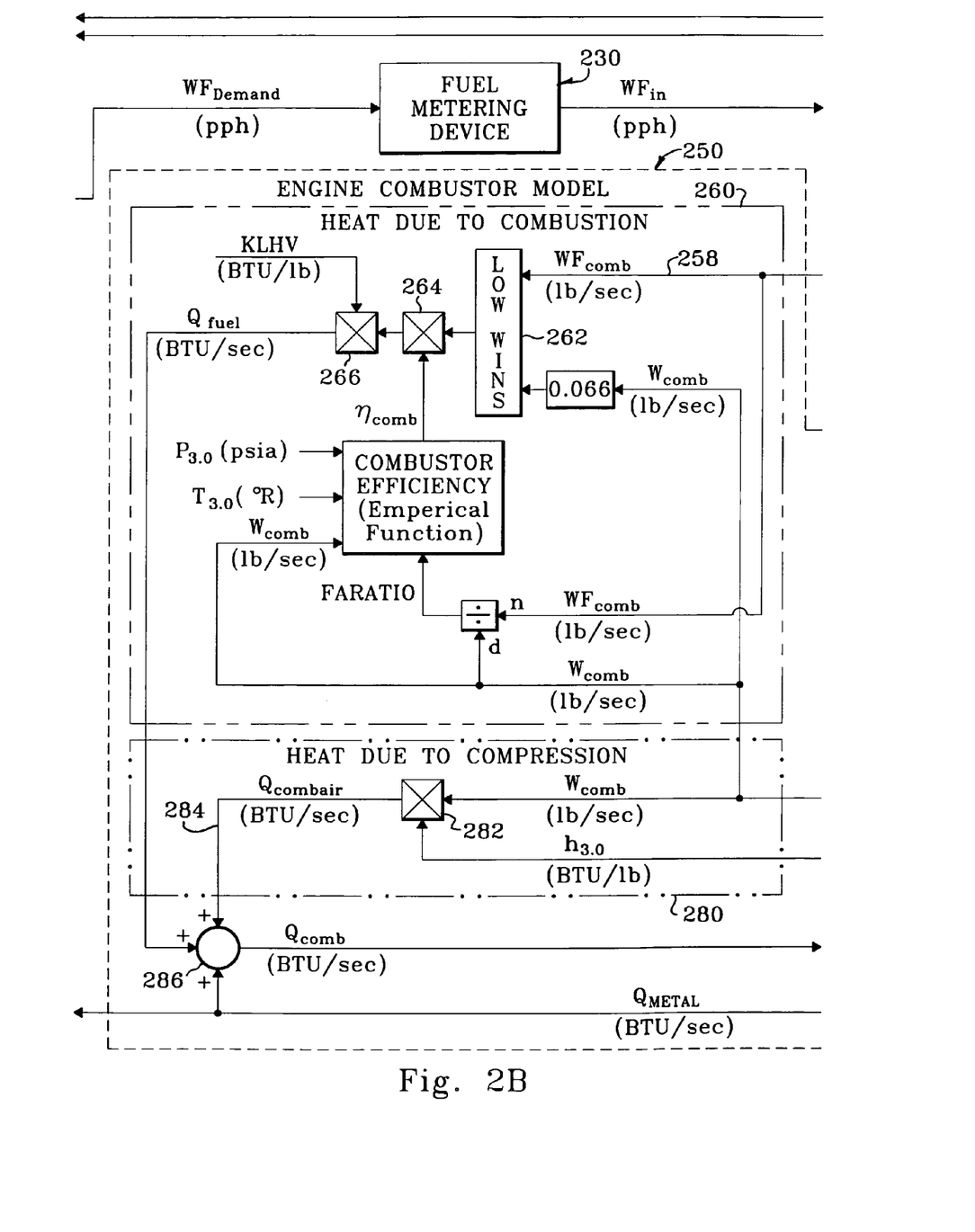
Figure 2C:
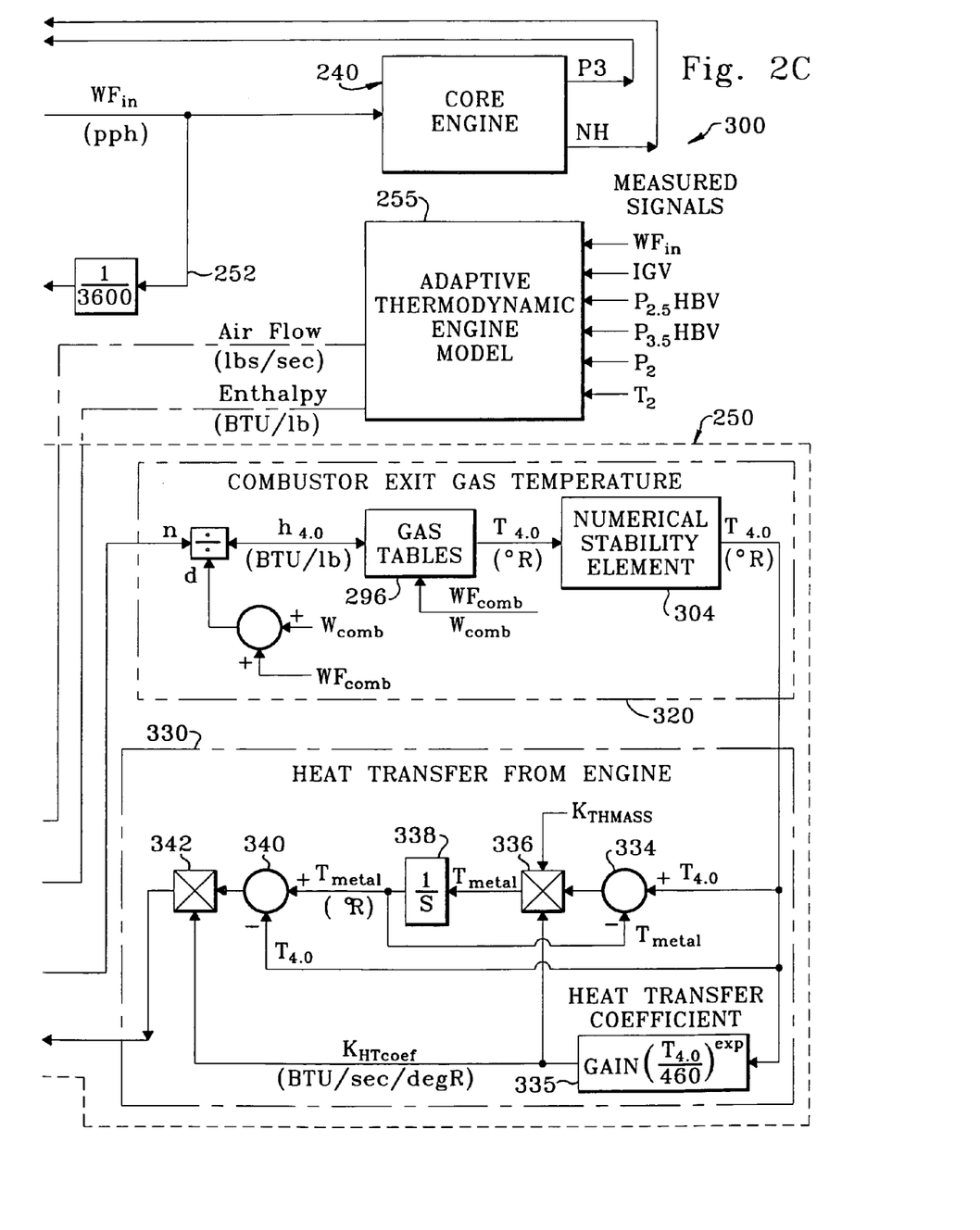
Figure 3A:
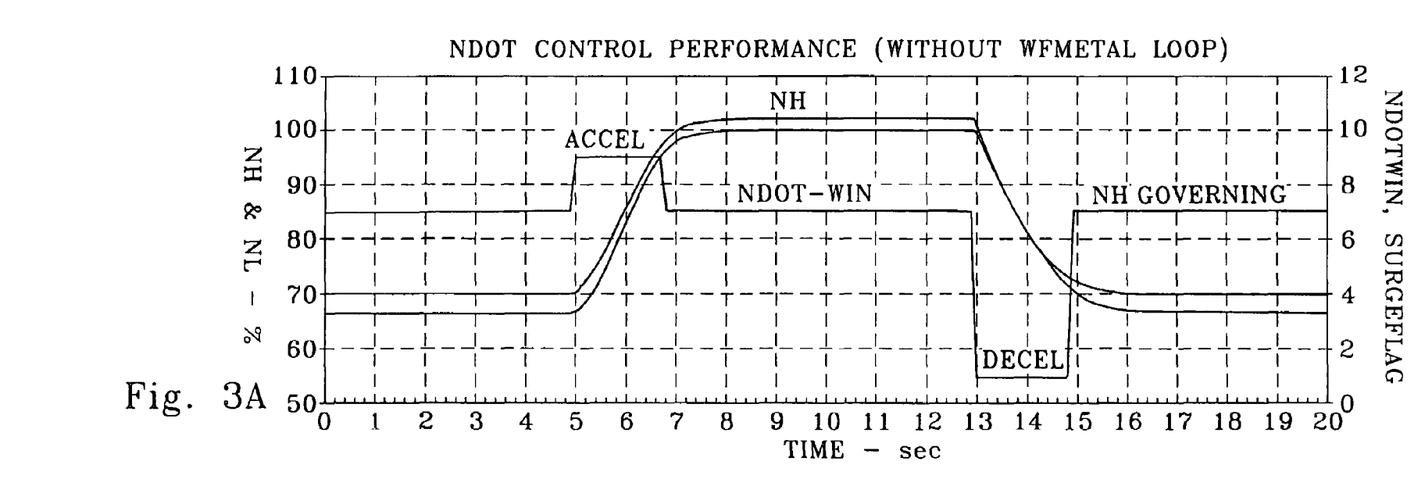
FIGS. 3a–3d are graphical representations of the change in various engine parameters over time during a simulated engine acceleration and deceleration wherein the $WF_{METAL}$ loop of the fuel control system is disabled.
Figure 3B:
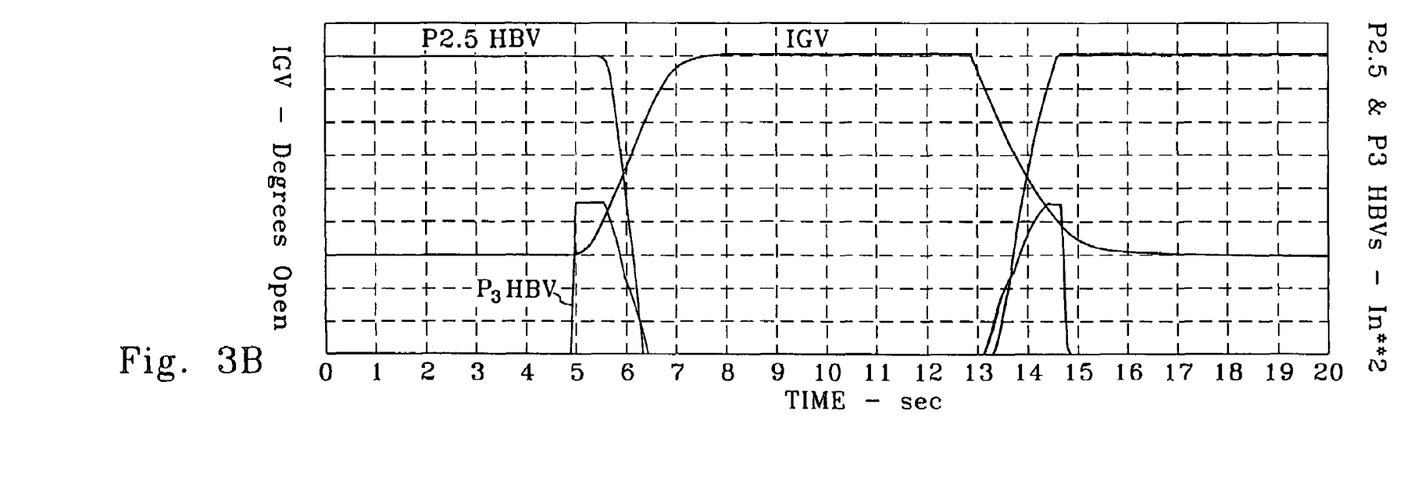
Figure 3C:
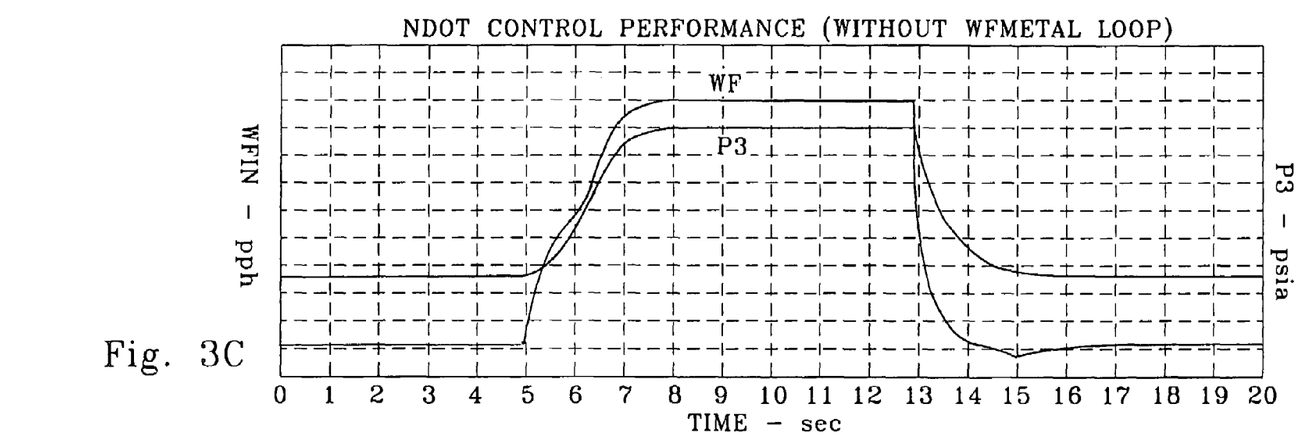
Figure 3D:
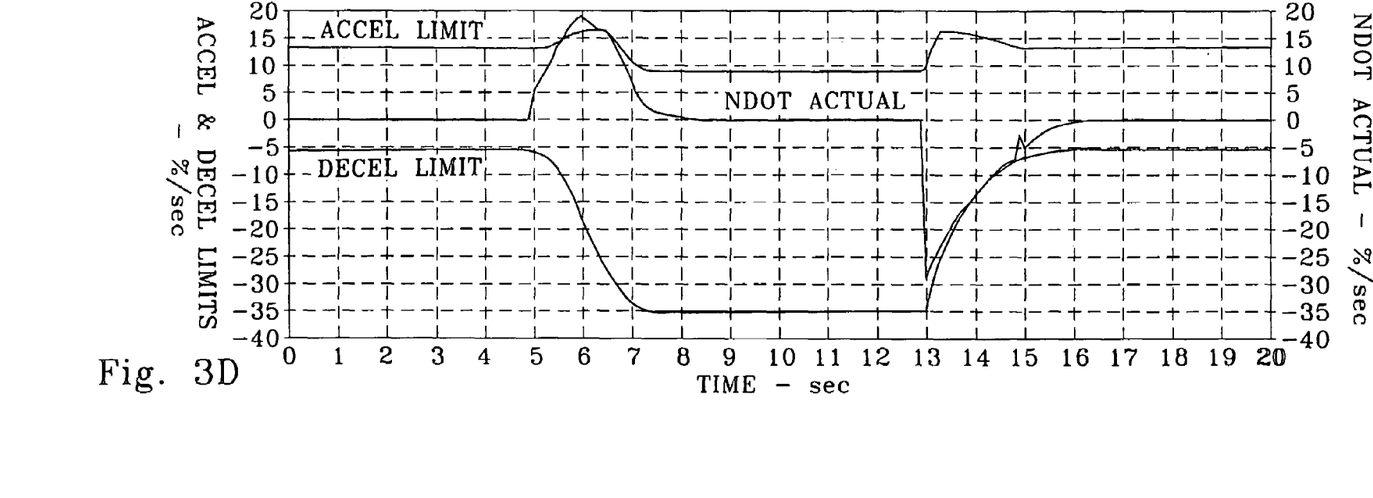

Referring now to FIGS. 2a–2c, there is a schematic representation of a preferred embodiment of the fuel control system 300 of the present disclosure. Fuel control system 300 includes NDOT controller 200, auctioning circuits 210 and 220, Fuel Metering Device 230, core engine 240, adaptive thermodynamic engine model 255, engine combuster model 250 and fuel flow adjuster model 310.

NDOT controller 200 functions in a similar manner to NDOT tracking system 100. The gas generator speed (NH) and the high pressure compressor discharge pressure (P3) are measured by sensors and are applied to NDOT controller 200. $NDOT_{Demand}$, which is based on the engine acceleration schedule, is also applied to NDOT controller 200. Using a method which is similar to the method previously described for tracking system 100, NDOT controller 200 attempts to track the actual NDOT rate to the demanded NDOT rate and determine the desired amount of fuel flow (WF) to be supplied to the core engine. The output of NDOT controller 200 is a signal representing the desired WF.

Fuel control system 300 differs from prior state-of-the art systems in that the WF signal provided to summing junction 212 by NDOT controller 200, having units of pounds per hour (pph), is adjusted to account for the real-time thermodynamic engine effects. It is the engine combuster model 250 and the fuel flow adjuster model 310 which provide the required adjustment to the WF signal. The engine combuster model 250 is a component of the adaptive aero-thermodynamic engine model 255 both of which are described in U.S. patent application Ser. No. 09/963,221, filed Sep. 26, 2001, which is herein incorporated by reference in its entirety. Engine combuster model 250 determines the amount of heat transferred during combustion between the combustion gases to the engine metal. The fuel flow to the combuster ($WF_{comb}$) is sensed and the combuster air flow ($W_{comb}$) and the high pressure compressor enthalpy ($h_{3.0}$) are computed by the adaptive thermodynamic engine model 255. These signals are provided as inputs to the combuster model 250. From these signals, the combuster model determines the heat due to combustion, the heat due to compression, the combuster exit gas temperature and finally, the heat transferred from the combustion gases to and from the engine metal. The operative steps for performing these functions will be described in detail hereinbelow.

Engine combuster model 250 provides a signal representative of the heat transferred to the metal in BTUs/sec to the fuel flow adjuster model 310. Fuel flow adjuster model 310 takes the signal from combuster model 250 and determines the effective or equivalent fuel flow required to account for the heat transfer (WF$_{METAL}$) and provides a signal relative thereto in pph to summing junction 212.

As a result, during an engine acceleration, when the gas temperature is hotter than the metal temperature, heat is transferred to the engine metal and WF$_{METAL}$ is negative. By multiplying WF$_{METAL}$ by a positive gain K$_{WFLEAD}$ (typically ≦1) and subtracting the resulting variable, WF$_{LEAD}$ (a negative value) from the normal demanded WF downstream of the NDOT controller 200 at summing junction 212, a delta increase in WF$_{Demand}$ is created to compensate for the heat loss. During an engine deceleration, when the gas temperature is cooler than the metal temperature, WF$_{METAL}$ and WF$_{LEAD}$ are positive and a delta decrease in WF$_{Demand}$ is created to compensate for the heat gain. During steady state conditions, when the gas and the metal temperatures are stabilized, WF$_{METAL}$ and WF$_{LEAD}$ are essentially zero. The additional contribution to WF$_{Demand}$ is also zero and thus, the WF$_{METAL}$ loop, which includes engine combuster model 250 and fuel flow adjuster model 310, does not interfere with normal governing functions during steady-state operating conditions.

The output of summing junction 212 is the adjusted fuel flow (WF$_{adj}$). The signal representing WF$_{adj}$ is applied to serial auctioning circuits 210 and 220 which specify an allowable fuel flow range (maximum and minimum) based on engine operating parameters. WF$_{max}$ is established based on engine acceleration, torque and temperature limiters, and WF$_{min}$ is a function of the engine flameout characteristics. The output signal from auctioning circuits 210 and 220 represents the final demanded fuel flow (WF$_{Demand}$). This signal is provided to the fuel metering device 230. Fuel metering device 230 represents a hydro-mechanical fuel delivery system which can include components such as a main fuel pump and a boost stage pump. Fuel metering device 230 is responsible for metering the fuel delivered to core engine 240 and its output represents the fuel delivered to the core engine (WF$_{in}$). Alternative pumping and metering arrangements are also envisioned for use with control system 300, such as variable delivery pumping systems.

With continuing reference to FIGS. 2a–2c, as noted above, combuster model 250 includes a mechanism for predicting the heat generated by the combustion of the fuel. A schematic representation of this mechanism or methodology is illustrated in the area identified by reference numeral 260. A measured signal of WF$_{in}$ is first divided by 3600 sec/hour, thereby converting the fuel flow signal to pounds per second (lb/s). This value is represented by WF$_{comb}$ and is compared at auctioning circuit 262 to the maximum amount of fuel that can be burned based on the fuel to air ratio. The output of auctioning circuit 262 is the lowest of the WF$_{comb}$ and the maximum possible fuel burned (i.e. air flow (W$_{comb}$)*0.066). The resulting output is applied to multiplier 264 along with the combuster efficiency ($\eta_{comb}$) which is a function of the fuel to air ratio (WF$_{comb}$/W$_{comb}$), P$_{3.0}$ and the combuster inlet temperature (T$_{3.0}$). The combuster efficiency ($\eta_{comb}$) is based on the measured operating parameters and can be represented by a nominal value which only changes as a function of the operating parameters. Alternatively, a dynamic component efficiency can be developed which adapts over time to account for degradation of the engine components. U.S. patent application Ser. No. 09/963,221, incorporated by reference above, discloses a method for adapting the engine component efficiencies to account for component degradation. The resulting output signal from above is multiplied by the heating coefficient of fuel (KLHV) at multiplier 266 and results in a signal representative of the heat due to combustion Q$_{fuel}$ (BTU/sec).

Reference numeral 280 represents the schematic illustration of the mechanism or method for determining the heat due to compression. As previously noted the air flow (W$_{comb}$) and enthalpy (h$_{3.0}$) are provided to engine combuster model 280. The signals are applied to multiplier 282, resulting in an output signal of the heat due to compression Q$_{combair}$ (BTU/sec).

Both Q$_{fuel}$ and Q$_{combair}$ are provided to summing junction 286 which provides an output signal to temperature model 320. Temperature model 320 determines the combuster exit gas temperature (T$_{4.0}$) and the heat transferred to the metal (Q$_{METAL}$). The combined heat due to combustion and compression is represented by Q$_{comb}$. Q$_{comb}$ is divided by the total weight of the fuel/air mixture and results in a signal representing the combuster exit gas enthalpy (h$_{4.0}$). Based on gas tables 296, the fuel to air ratio and the h$_{4.0}$ signal, T$_{4.0}$ is determined. Numerical stability element 304 is used to condition the signal. Starting with T$_{4.0}$ from the previous time step, iterate on the output of numerical stability element 304 until the input matches the output. The resulting T$_{4.0}$ signal is provided on line 306 to heat transfer model 330.

Heat transfer model 330 provides a method for converting T$_{4.0}$ or the outlet gas temperature into the equivalent heat transferred to the engine metal (Q$_{METAL}$). As can be seen from the schematic, the method of determining the Q$_{METAL}$ is iterative. Initially T$_{4.0}$ is applied to summing junction 334 and a previously calculated T$_{METAL}$ (initially zero) is subtracted therefrom. The resulting signal is applied to multiplier 336 along with a coefficient of thermal mass for the engine (K$_{THMASS}$) and a heat transfer coefficient. K$_{HTcoef}$ The heat transfer coefficient is determined by the formula:

$$K_{HTcoef} = KHT_{coefgain}(T_{4.0}/460)^{KHTcoefexp}$$

KHT$_{coefgain}$ and K$_{Htcoefexp}$ represent a gain coefficient and a heat transfer exponent respectively, both of which are determined empirically through experimentation. K$_{THMASS}$ represents an estimated coefficient of thermal mass for the engine which has been determined based on engine manufacturer testing. The resulting signal from multiplier 336, which represents a dynamic heat transfer value, is applied to integrator 338. The output of integrator 338 is the metal temperature T$_{METAL}$ from which T$_{4.0}$ is subtracted at junction 340. The output of junction 340 and the heat transfer coefficient are multiplied at multiplier 342 having an output signal which represents the heat transferred to the metal Q$_{METAL}$.

Lastly, Q$_{METAL}$ is applied to fuel flow adjuster model 310 where it is first divided by a signal representing the combuster efficiency ($\eta_{comb}$). The resulting signal is divided by the heating value of fuel (KLHV). These method steps convert the heat transferred between the combustion gases and the engine metal into an effective fuel transfer per second. The effective fuel transfer per second is next converted into an effective fuel transfer per hour. K$_{WFlead}$ gain amplifier 312 is applied to WF$_{METAL}$ to determine the desired adjustment to WF to account for the real-time thermodynamic losses (WF$_{LEAD}$). K$_{WFlead}$ is typically a constant having a value selected to be greater than zero and less than or equal to one (0<K$_{WFlead}$≦1).

One skilled in the art will readily appreciate that the engine combuster model 250 is only a representative embodiment of a method in which the heat transferred to the metal can be determined. Engine combuster model 250 represents a method which utilizes the inputs of fuel flow, air flow and enthalpy to determine, based on dynamic logic models, the heat transferred to the metal. Alternative engine models can be used which have additional or fewer data inputs and sensor measurements. Additionally, rather than estimating the heat transferred between the combustion gases and the engine metal, $Q_{METAL}$ can be measured. However, this is not practical or cost effective at the present time because numerous high response, high temperature and low reliability temperature sensors would need to be located throughout the engine.

Figure 4:
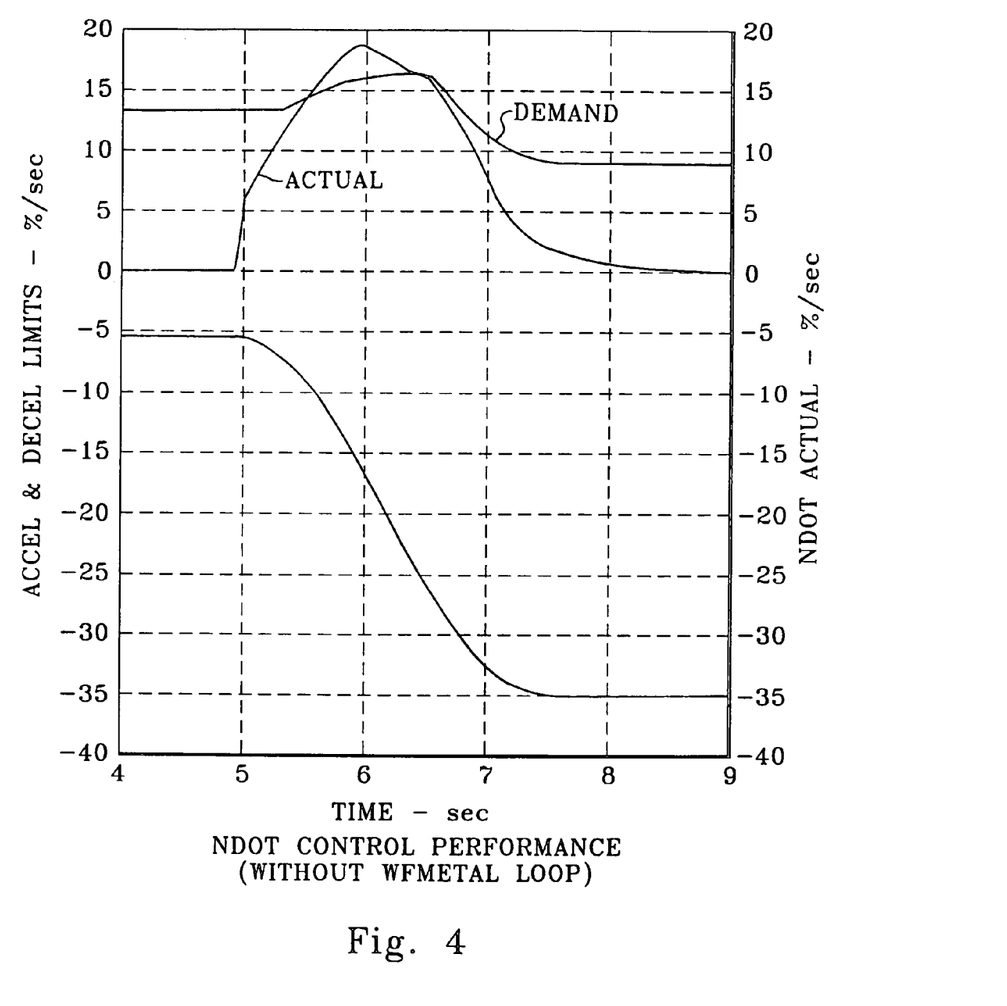
FIG. 4 is an enlarged graphical representation of FIG. 3d illustrating the poor tracking performance of the control system with the $WF_{METAL}$ loop disabled.
Figure 5A:
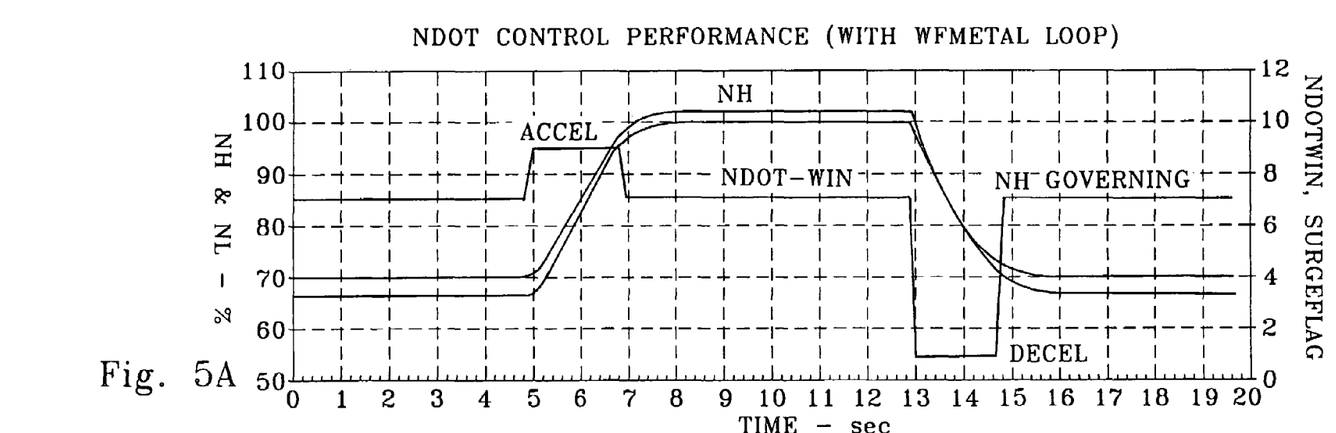
FIGS. 5a–5d are graphical representations of the change in various engine parameters over time during a simulated engine acceleration and deceleration wherein the $WF_{METAL}$ loop of the fuel control system is enabled.
Figure 5B:
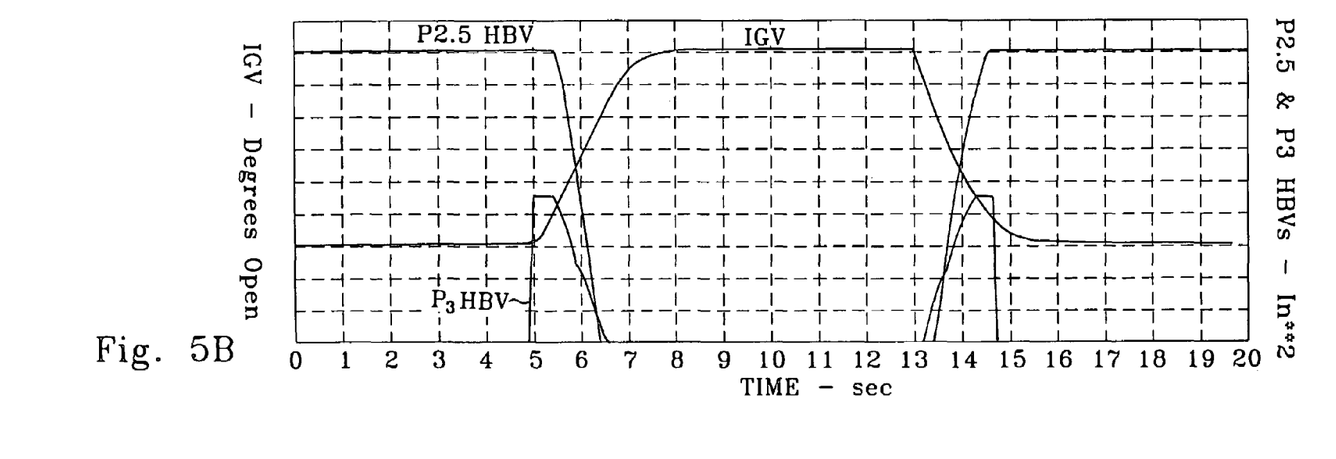
Figure 5C:
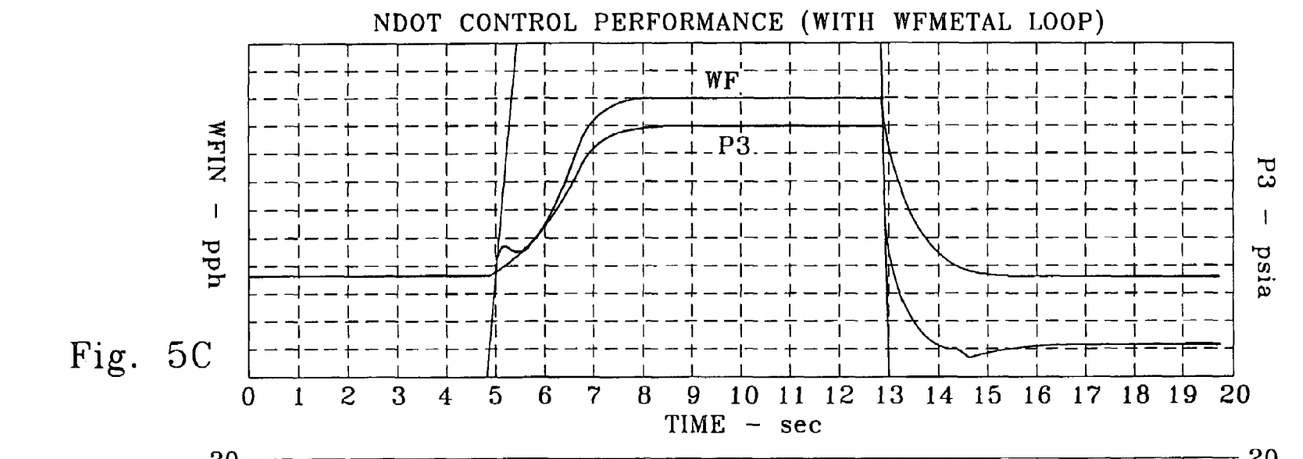
Figure 5D:
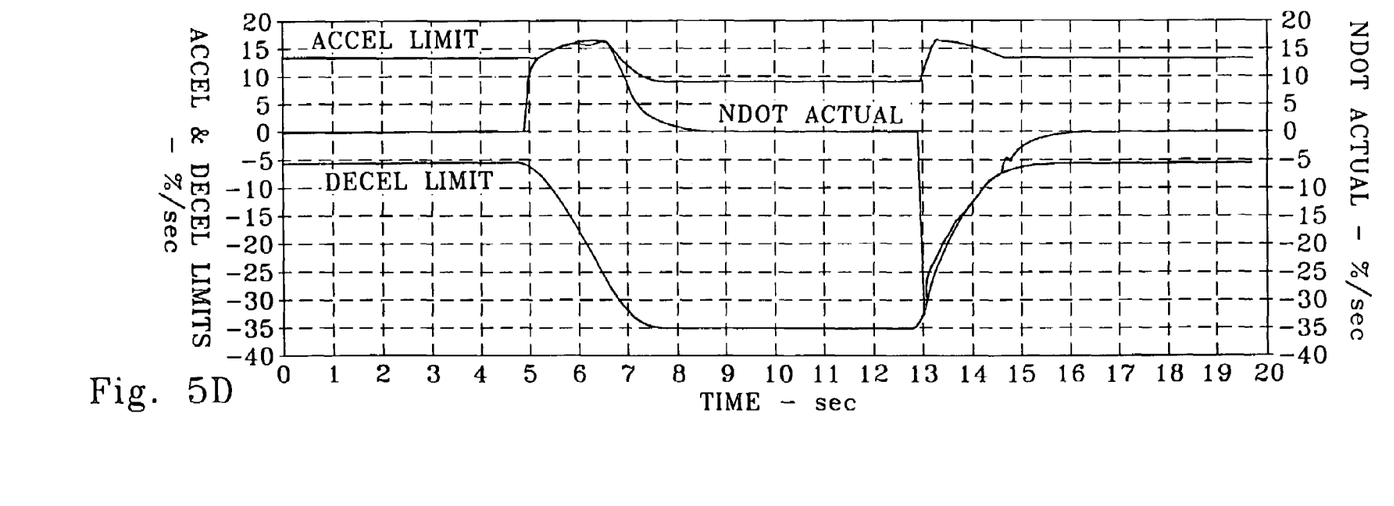

Referring now to FIGS. 3a–3d which illustrate four graphical traces which detail the change with respect to time of various engine parameters during an engine acceleration and deceleration simulation. Fuel control system 300 was used in the simulation with the $WF_{METAL}$ control loop (i.e., effective fuel flow adjustment model) disabled. FIG. 4 is an enlarged view of FIG. 3d which illustrates the change and $NDOT_{Actual}$ and $NDOT_{Demand}$ with respect to time. As can be seen, during the rapid engine acceleration, the $NDOT_{Actual}$ rate reacts slowly to the demanded NDOT rate or the acceleration limit and then overshoots the limit, resulting in degraded surge margin.

FIGS. 5a–5d illustrate an engine acceleration and deceleration simulation which is identical to that of FIGS. 3a–3d and 4, however, the $WF_{METAL}$ loop is enabled and the real-time thermodynamic engine effects are accounted for in determining WF.

Figure 6:
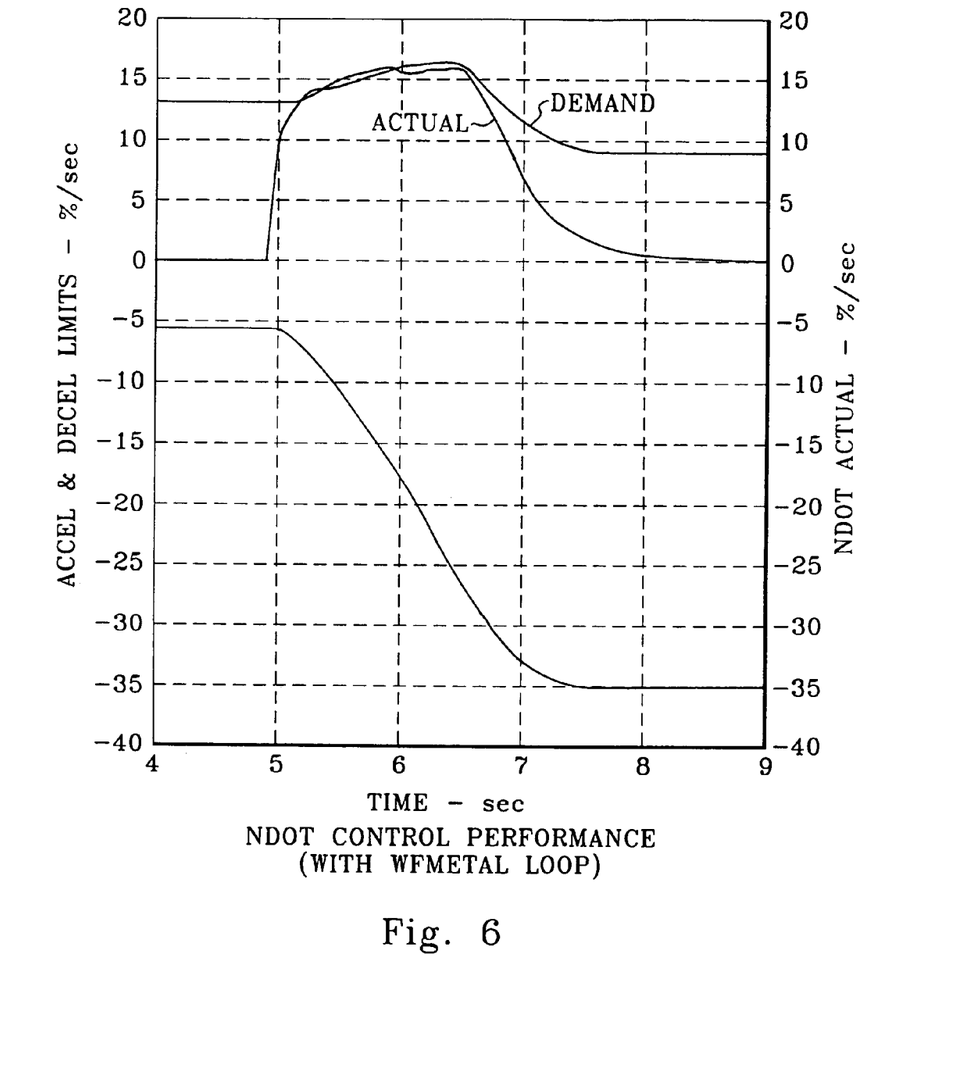
FIG. 6 is an enlarged graphical representation of FIG. 5d illustrating the dramatically improved NDOT tracking performance of the fuel control system with the $WF_{METAL}$ loop enabled.

As clearly illustrated in FIG. 6, fuel control system 300 of the subject disclosure provides marked improvement over the conventional tracking system 100. During the rapid engine acceleration, the $NDOT_{Actual}$ tracks closely to the $NDOT_{Demand}$ rate without any significant lagging. Additionally, the actual NDOT rate does not overshoot the acceleration limit.

Control system 300 has been illustrated in an analog fashion, but those skilled in the art will readily appreciate that the signal processing function can be performed in a digital computer.

While the invention has been described with respect to preferred embodiments, those skilled in the art will readily appreciate that various changes and/or modifications can be made to the invention with departing from the spirit or scope of the invention as defined by the appended claims.

What is claimed is:

1. A fuel control method for gas turbines having a compressor and a gas generator, comprising:
    a) measuring a plurality of engine operating parameters;
    b) determining an initial engine fuel demand based on the plurality of measured engine operating parameters;
    c) estimating during engine operation and based on the plurality of measured operating parameters, an amount of heat transferred between fuel combustion gases and engine metal;
    d) estimating an effective fuel flow adjustment based on the estimated heat transfer between the combustion gases and the engine metal; and
    e) determining a final engine fuel demand based on the initial engine fuel demand and the estimated effective fuel flow adjustment.

2. A fuel control method as recited in claim 1, wherein the step of measuring a plurality of engine operating parameters includes the steps of measuring the gas generator speed and providing a gas generator speed signal indicative of the actual rotary speed of the gas generator.

3. A fuel control method as recited in claim 2, wherein the step of determining the initial engine fuel demand includes the use of fuel flow controller which iteratively compares an actual rate of change of gas generator speed which is determined from the gas generator speed signal to a maximum and minimum desired rate of change of gas generator speed.

4. A fuel control method as recited in claim 3, wherein the maximum and minimum desired rate of change of gas generator speed is determined based on an acceleration/deceleration schedule and is a function of the gas generator speed signal.

5. A fuel control method as recited in claim 1, wherein the step of measuring a plurality of engine operating parameters includes the steps of measuring engine compressor discharge pressure and providing a compressor discharge pressure signal indicative of the actual engine compressor discharge pressure.

6. A fuel control method as recited in claim 1, wherein the step of estimating the amount of heat transferred between the fuel combustion gases and the engine metal comprises:
    a) estimating an amount of heat generated by engine fuel combustion;
    b) estimating an amount of heat generated by engine supply air compression; and
    c) estimating gas generator exit gas temperature.

7. A fuel control method as recited in claim 1, wherein the step of estimating the effective fuel flow adjustment includes determining the effective fuel flow adjustment from the estimated heat transfer, a gas generator efficiency and a heating coefficient of fuel.

8. A fuel control method as recited in claim 7, wherein the step of estimating the effective fuel flow adjustment further comprises amplifying by amplifier means the effective fuel flow adjustment.

9. A fuel control method as recited in claim 1, further comprising providing, by means of a fuel metering system, fuel to the engine based on the signal of final engine fuel demand.

10. A fuel control method as recited in claim 9, wherein the fuel metering device includes a variable displacement vane pump.

* * * * *